(12) United States Patent
Lee et al.

(10) Patent No.: US 8,564,219 B2
(45) Date of Patent: *Oct. 22, 2013

(54) CIRCUITS AND METHODS FOR DRIVING LIGHT SOURCES

(75) Inventors: Sheng Tai Lee, Taipei (TW); Yung Lin Lin, Palo Alto, CA (US); Chuan Chiung Kuo, Taipei (TW)

(73) Assignee: O2Micro, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/096,646

(22) Filed: Apr. 28, 2011

(65) Prior Publication Data

US 2011/0221346 A1    Sep. 15, 2011

Related U.S. Application Data

(63) Continuation-in-part of application No. 12/953,353, filed on Nov. 23, 2010.

(51) Int. Cl.
*H05B 37/02* (2006.01)
(52) U.S. Cl.
USPC .......................... 315/291; 315/209 R; 315/308
(58) Field of Classification Search
USPC ...... 315/209 R, 210, 224, 226, 291, 307, 308
See application file for complete search history.

(56) References Cited

U.S. PATENT DOCUMENTS

| | | | |
|---|---|---|---|
| 5,457,450 A | 10/1995 | Deese et al. | |
| 6,856,103 B1 | 2/2005 | Hudson et al. | |
| 6,864,641 B2 * | 3/2005 | Dygert | 315/216 |
| 7,622,871 B2 | 11/2009 | Awalt et al. | |
| 7,733,034 B2 * | 6/2010 | Kotikalapoodi et al. | 315/294 |
| 7,741,788 B2 * | 6/2010 | Ito et al. | 315/247 |
| 7,791,326 B2 | 9/2010 | Dahlman et al. | |
| 7,855,520 B2 * | 12/2010 | Leng | 315/307 |
| 7,940,014 B2 * | 5/2011 | Shin et al. | 315/294 |
| 7,960,922 B2 * | 6/2011 | Roberts et al. | 315/307 |
| 7,977,891 B2 * | 7/2011 | Shiu et al. | 315/291 |
| 7,993,021 B2 | 8/2011 | Roberts et al. | |

(Continued)

FOREIGN PATENT DOCUMENTS

| | | |
|---|---|---|
| CN | 101668373 A | 3/2010 |
| CN | 101702849 A | 5/2010 |

(Continued)

OTHER PUBLICATIONS

Datasheet describing Acrich2 IC, Seoul Semiconductor Inc., Aug. 2011 (16 pages).

(Continued)

*Primary Examiner* — Thuy Vinh Tran

(57) ABSTRACT

Embodiments in accordance with the present invention provide circuits and methods for driving a light-emitting diode (LED) light source. In one embodiment, a printed circuit board (PCB) includes a bridge rectifier rectifying an AC voltage to a rectified AC voltage, an LED light source, and a first switch coupled to the LED light source in series controlling a current through the LED light source according to a predetermined current reference. The LED light source and the first switch coupled in series receive the rectified AC voltage while the first switch is controlled linearly. The circuit further includes a current path coupled in parallel with the LED light source and an illuminated switch coupled between the AC power source and the bridge rectifier.

13 Claims, 11 Drawing Sheets

(56) References Cited

U.S. PATENT DOCUMENTS

| | | |
|---|---|---|
| 8,044,609 B2 * | 10/2011 | Liu .............................. 315/291 |
| 8,395,332 B2 | 3/2013 | Lee et al. |
| 2002/0175826 A1 | 11/2002 | Hutchison et al. |
| 2006/0244396 A1 | 11/2006 | Bucur |
| 2006/0267514 A1 | 11/2006 | Xu |
| 2008/0144299 A1 * | 6/2008 | Redmond .................... 361/764 |
| 2008/0203946 A1 * | 8/2008 | Ito et al. ........................ 315/307 |
| 2009/0322235 A1 | 12/2009 | Shiu et al. |
| 2010/0033109 A1 | 2/2010 | Liu et al. |
| 2011/0248640 A1 | 10/2011 | Welten |
| 2011/0254467 A1 | 10/2011 | Chiang et al. |
| 2011/0273112 A1 | 11/2011 | Lee et al. |
| 2011/0316441 A1 | 12/2011 | Huynh |
| 2012/0139448 A1 | 6/2012 | Chiang et al. |

FOREIGN PATENT DOCUMENTS

| | | |
|---|---|---|
| CN | 101827478 A | 9/2010 |
| JP | 2006147933 A | 6/2006 |
| JP | 2008544569 A | 12/2008 |
| JP | 2009230973 A | 10/2009 |
| JP | 2010232052 A | 10/2010 |

OTHER PUBLICATIONS

Office Action issued in Japanese Patent Application No. 2012-166813 dated Aug. 8, 2013 (3 pages).

* cited by examiner

CIRCUITS AND METHODS FOR DRIVING LIGHT SOURCES

RELATED APPLICATIONS

This application is a continuation-in-part of the co-pending U.S. application, Ser. No. 12/953,353, entitled "Circuits and Methods for Driving Light Source", filed on Nov. 23, 2010, which is hereby incorporated by reference in its entirety.

BACKGROUND

Light-emitting diodes (LEDs) can be used in many applications such as general lighting. LEDs offer several advantages over traditional light sources such as fluorescent lamps and incandescent lamps. For example, LEDs have significant lower power consumption. Unlike traditional light sources such as incandescent light bulbs that convert significant electrical current heating up the metal filaments to a temperature high enough to generate light, LEDs generate virtually no heat and utilize a fraction of the energy to produce an equivalent lumen of lighting. For example, in a light bulb application, an LED light source may consume less than 7 Watts to produce the same amount of brightness compared to an incandescent light source consuming approximately 60 Watts.

Furthermore, the operational life of an LED can be extended to over 50,000 hours which is significantly longer than the average life of an incandescent bulb, e.g., 5000 hours, and the average life of a fluorescent lamp, e.g., 15,000 hours. Moreover, LEDs contain no mercury or any other hazardous materials or chemicals and emit zero ultra violet (UV) radiation unlike incandescent or fluorescent lamps. The use of the LEDs materially enhances the environment and conserves energy.

Traditionally, an AC/DC converter converts an AC voltage to a substantial DC voltage to power the LEDs. FIG. 1 illustrates a typical driving circuit 100 for driving a light source, e.g., an LED array 108. The driving circuit 100 includes a bridge rectifier 104 for rectifying the AC voltage to a rectified AC voltage, and an electrolytic capacitor Cbulk having a relatively large size coupled to the bridge rectifier 104 for filtering the rectified AC voltage to provide a substantially constant DC voltage VIN.

The driving circuit 100 further includes a switching-mode DC/DC converter 122 that converts the DC voltage VIN to a DC voltage VOUT across a capacitor 116 to power the LED array 108. In operation, a controller 118 generates an ON/OFF signal to turn a switch 106 fully on and off alternately to control the power for the LED array 108. However, the turn-on and turn-off of the switch 106 generates electromagnetic interference (EMI) noise such that an EMI filter 130 is required to suppress the noise on the power line. In addition, the switching-mode DC/DC converter 122 usually includes elements such as an inductor 112 and a capacitor 116 for energy storage and/or filtering function. Such elements are also relatively large in size and are difficult to be placed into the commercial available lighting fixtures such as E12, E14, E17 LED bulbs or T-5 and T-8 LED light tubes.

SUMMARY

Embodiments in accordance with the present invention provide circuits and methods for driving light sources, e.g., a light-emitting diode (LED) light source. In one embodiment, a printed circuit board (PCB) includes a bridge rectifier rectifying an AC voltage to a rectified AC voltage, an LED light source, and a first switch coupled to the LED light source in series controlling a current through the LED light source according to a predetermined current reference. The LED light source and the first switch coupled in series receive the rectified AC voltage while the first switch is controlled linearly.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present invention provide circuits and methods for driving one or more light sources such as a light-emitting diode (LED) light source. By way of example, the circuits and methods in accordance with embodiments of the present invention can be used in lighting fixtures including, but are not limited to, E12, E14, E17 light bulbs or T-5 and T-8 tubes. In one embodiment, the circuits include an AC/DC linear converter. Advantageously, the AC/DC linear converter in accordance with embodiments of the present invention can achieve relatively high power efficiency as well as relatively high power factor. In one embodiment, the AC/DC linear converter and the light source can be mounted on a printed circuit board (PCB) which is relatively thin, making it easier to be fit into lighting fixtures such as E12, E14, E17 light bulbs or T-5 and T-8 tubes. Moreover, unlike the conventional AC/DC converter cooperating with the switching-mode DC/DC converter, the AC/DC linear converter in accordance with embodiments of the present invention does not generate electromagnetic interference (EMI) noise, and thus does not require EMI filters. In addition, the bulky circuitry components such as inductors in the conventional switching mode DC/DC converter can be omitted. Therefore, the circuits and methods for driving one or more light sources in accordance with embodiments of the present invention achieve improved efficiency and reduced cost.

Figure 1:
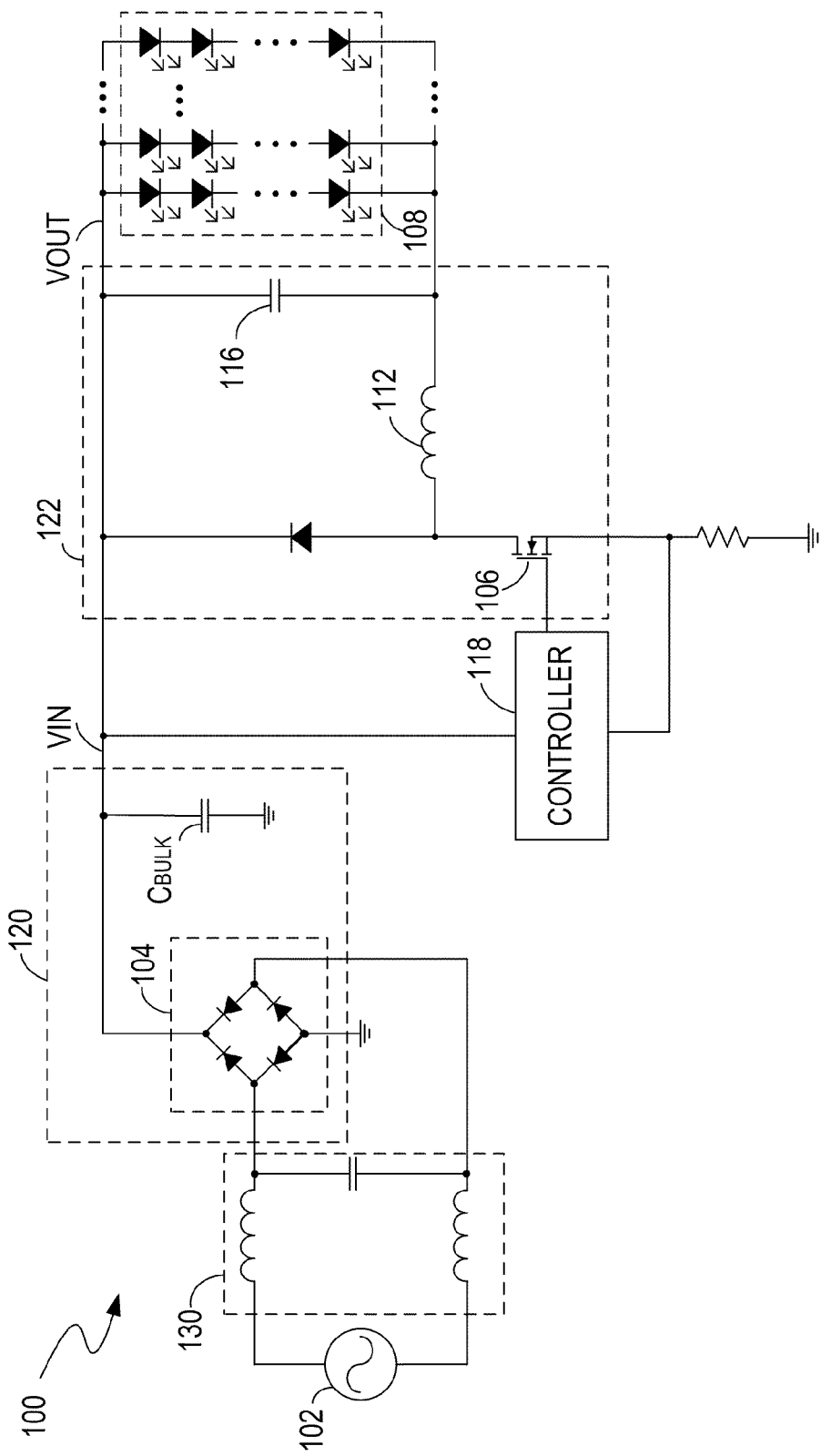
FIG. 1 illustrates a conventional driving circuit for driving a light source.
Figure 2:
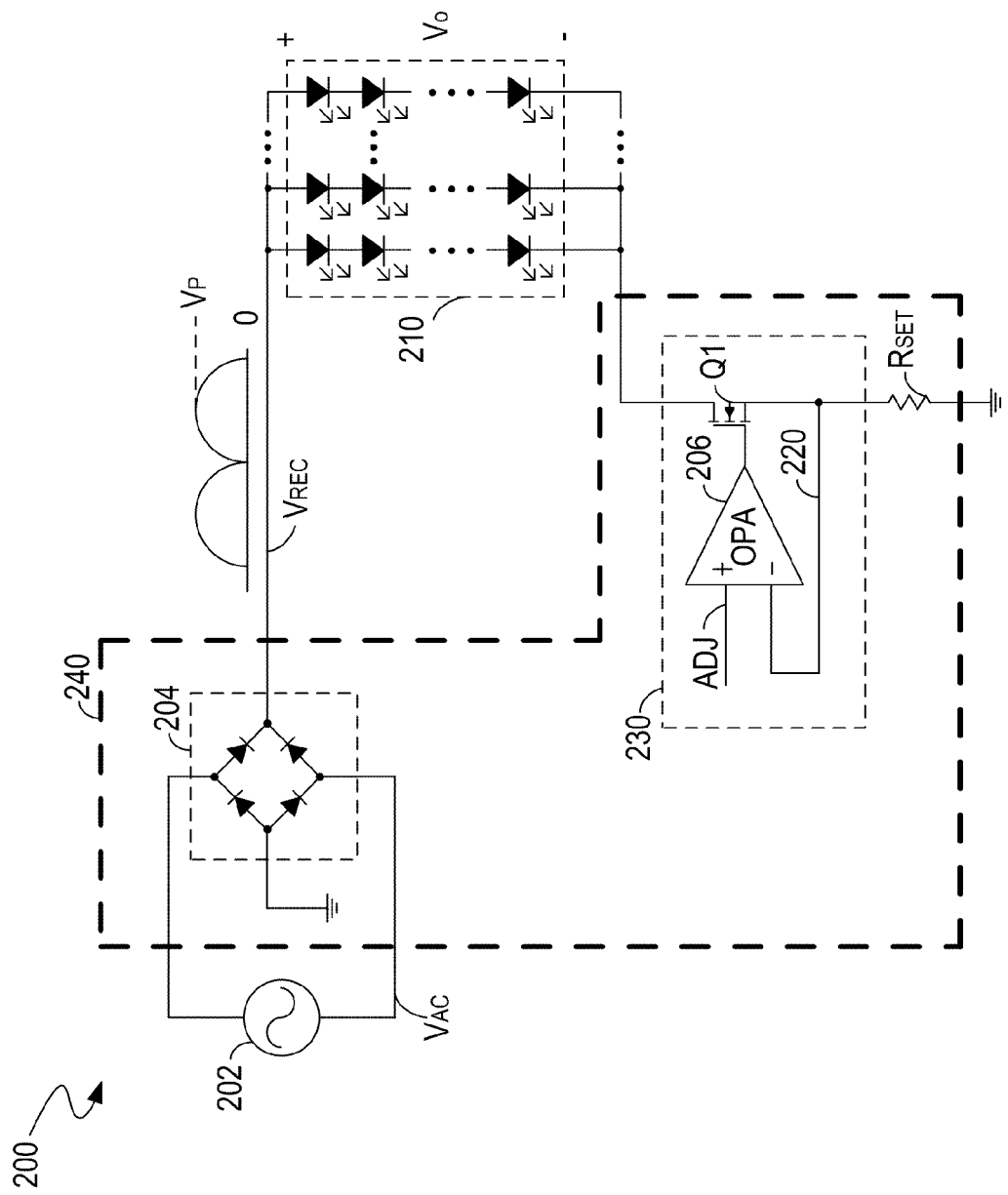
FIG. 2 shows a driving circuit, in accordance with one embodiment of the present invention.

FIG. 2 shows a driving circuit 200, in accordance with one embodiment of the present invention. In the example of FIG. 2, the driving circuit 200 includes an AC/DC linear converter 240 for receiving an AC voltage and controlling a current flowing through a light source. For illustrative purposes, the light source in FIG. 2 includes an LED array 210 having a plurality of LED strings. The light source can be other types of light sources. In the example of FIG. 2, the AC/DC linear converter 240 includes a rectifier (e.g., a bridge rectifier 204) for rectifying an AC voltage $V_{AC}$ to a rectified AC voltage $V_{REC}$, a switch Q1 coupled to the LED array 210 in series for controlling a current through the LED array 210 according to a predetermined current reference, control circuitry (e.g., an operational amplifier 206) for controlling the switch Q1 linearly, and a current sensor (e.g., a sensing resistor $R_{SET}$) for sensing the current flowing through the light source and providing a sensing signal 220 to the control circuitry. In one embodiment, the switch Q1 is a power metal-oxide-semiconductor field-effect transistor (MOSFET).

Figure 3:
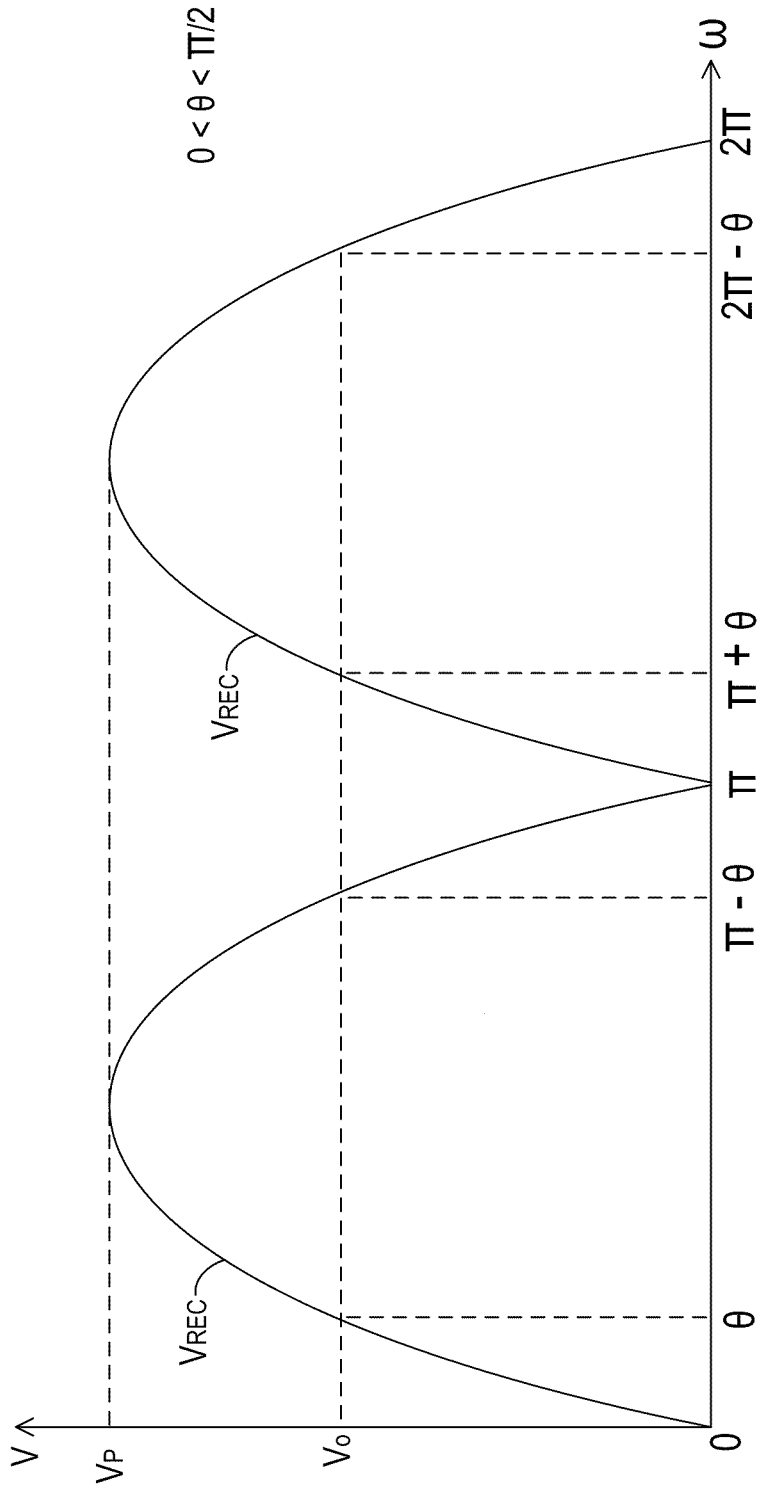
FIG. 3 shows an example of a rectified AC voltage $V_{REC}$, in accordance with one embodiment of the present invention.

FIG. 3 shows an example of the rectified AC voltage $V_{REC}$ during the period 0 to $2\pi$ of the $V_{AC}$, and is described in combination with FIG. 2. In one embodiment, the rectified AC voltage $V_{REC}$ is a periodic voltage signal. The rectified AC voltage $V_{REC}$ has a peak voltage $V_P$. The forward voltage $V_O$ of the LED array 210 intersects with the rectified AC voltage $V_{REC}$. The LED array 210 is powered on to its rating when the voltage across the LED array 210 is greater than the forward voltage $V_O$ of the LED array 210. More specifically, in the example of FIG. 3, the LED array 210 is powered on to its rating and is regulated when the rectified AC voltage $V_{REC}$ is greater than the forward voltage $V_O$ of the LED array 210. In one embodiment, the voltage drop across the sensing resistor $R_{SET}$ is relatively small and can be ignored.

Thus, in operation, the LED array 210 is powered on and regulated depending on the level of the rectified AC voltage $V_{REC}$. When the LED array 210 is powered on, e.g., when the rectified AC voltage $V_{REC}$ is greater than the forward voltage $V_O$ of the LED array 210, the control circuitry controls the switch Q1 linearly by comparing a sensing signal 220 indicative of the current through the LED array 210 to a reference signal ADJ indicative of the predetermined current reference such that the current through the LED array 210 is adjusted to the predetermined current reference. By way of example, the operational amplifier 206 compares the sensing signal 220 to the reference signal ADJ and generates an error signal to control the switch Q1 linearly. A current sensor, e.g., a sensing resistor $R_{SET}$ is coupled to the LED array 210 in series and for providing the sensing signal 220.

In the example of FIG. 3, the rectified AC voltage $V_{REC}$ is a half-wave sinusoidal voltage signal. However, the rectified AC voltage $V_{REC}$ is not limited to the example in FIG. 3. The rectified AC voltage can be other periodic signals so long as the forward voltage $V_O$ of the light source, e.g., the LED array 210, intersects with the rectified AC voltage assuming that the voltage drop across the sensing resistor $R_{SET}$ can be ignored. Thus, the rectified AC voltage has a peak voltage $V_P$ greater than the forward voltage $V_O$ of the light source and has a valley voltage less than the forward voltage $V_O$ of the light source.

In one embodiment, the current $I_O$ flowing through the LED array 210 can be given by:

$$I_O = ADJ/R_{SET}, \quad (1)$$

where ADJ represents the voltage level of the reference signal ADJ and $R_{SET}$ represents the resistance of the sensing resistor $R_{SET}$. The forward voltage $V_O$ of the LED array 210 can be given by:

$$V_O = V_P \times \sin\theta, \quad (2)$$

where $V_P$ represents the peak voltage of the rectified AC voltage $V_{REC}$, and $\theta$ is the conduction angle at which the rectified AC voltage $V_{REC}$ is substantially equal to the forward voltage $V_O$ of the LED array 210. In one embodiment, "substantially equal to" means that at the conduction angle $\theta$, the rectified AC voltage $V_{REC}$ may be slightly different from the forward voltage $V_O$ due to the voltage drop across the switch Q1 and the sensing resistor $R_{SET}$ and the non-ideality of the circuitry components in practical applications.

Therefore, the average input power $P_{in}$ during the period 0 to $\pi$ can be given by:

$$P_{in} = \frac{1}{\pi} \int_{\theta}^{\pi-\theta} I_0 \times V_p \times \sin\theta \, d\theta \quad \left(0 < \theta < \frac{\pi}{2}\right) \quad (3)$$

$$= \frac{1}{\pi} \times I_0 \times V_p \times (-\cos\theta)\Big|_{\theta}^{\pi-\theta} \quad \left(0 < \theta < \frac{\pi}{2}\right)$$

$$= \frac{1}{\pi} \times I_0 \times V_p \times 2 \times \cos\theta \quad \left(0 < \theta < \frac{\pi}{2}\right).$$

The output power $P_{out}$ of the LED array 210 during the period 0 to $\pi$ can be given by:

$$P_{out} = \frac{I_0 \times V_0 \times (\pi - \theta - \theta)}{\pi} \quad \left(0 < \theta < \frac{\pi}{2}\right) \quad (4)$$

$$= I_0 \times V_0 \times \left(1 - \frac{2 \times \theta}{\pi}\right) \quad \left(0 < \theta < \frac{\pi}{2}\right).$$

According to equations (3) and (4), the power efficiency $\eta$ of the AC/DC linear converter 240 can be calculated by:

$$\eta = \frac{P_{out}}{P_{in}} \quad (5)$$

$$= \frac{I_0 \times V_0 \times \left(1 - \frac{2 \times \theta}{\pi}\right)}{\frac{1}{\pi} \times I_0 \times V_0 \times 2 \times \cos\theta} \quad \left(0 < \theta < \frac{\pi}{2}\right)$$

$$= \frac{I_0 \times V_p \times \sin\theta \times \left(1 - \frac{2 \times \theta}{\pi}\right)}{\frac{1}{\pi} \times I_0 \times V_p \times 2 \times \cos\theta} \quad \left(0 < \theta < \frac{\pi}{2}\right)$$

$$= \frac{1}{2} \times \tan\theta \times (\pi - 2\theta) \quad \left(0 < \theta < \frac{\pi}{2}\right).$$

In addition, the total power dissipation $P_{loss}$, e.g., on the switch Q1 and sensing resistor $R_{SET}$, during the period 0 to $\pi$ can be obtained by:

$$P_{loss}=P_{in}-P_{out}=[(1/\eta)-1]P_{out}. \quad (6)$$

Figure 4:
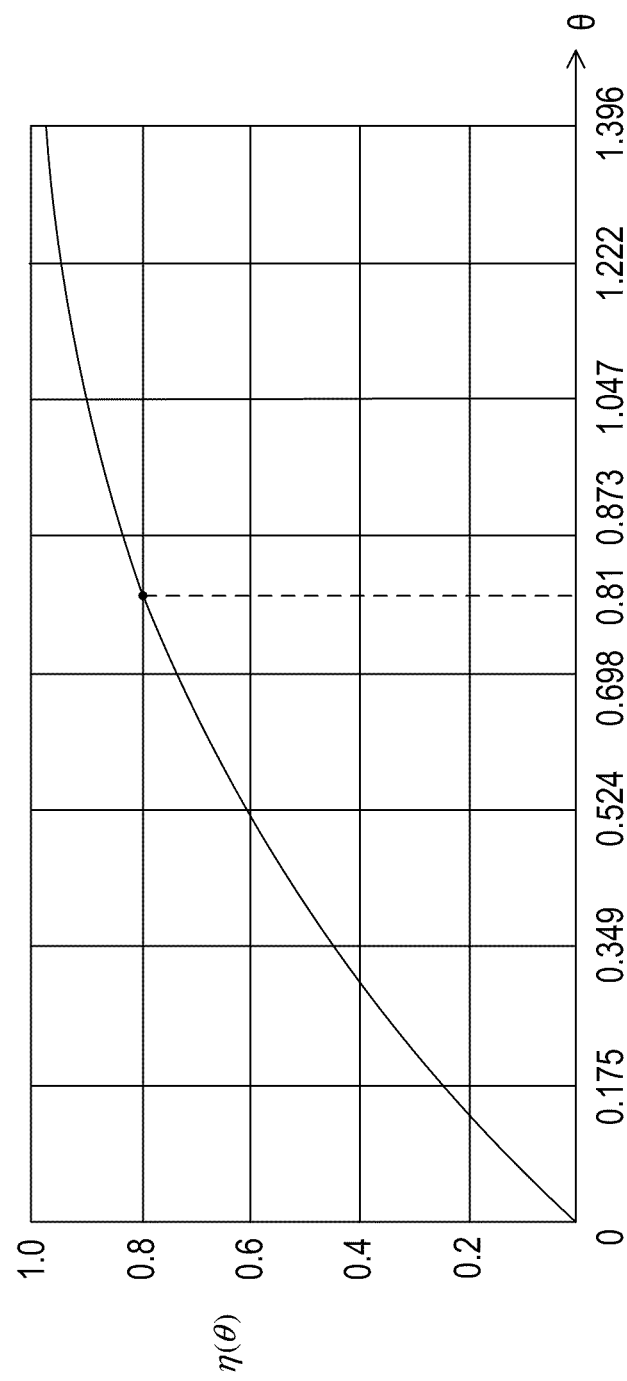
FIG. 4 shows the relationship between system power efficiency and a conduction angle, in accordance with one embodiment of the present invention.

According to equation (5), the relationship between the power efficiency $\eta$ and the conduction angle $\theta$ is shown in the example of FIG. 4.

Therefore, according to a given power efficiency $\eta$, the conduction angle $\theta$ can be obtained accordingly based on equation (5). If the peak voltage $V_P$ of the rectified AC voltage $V_{REC}$ is known, the forward voltage $V_O$ can be calculated according to equation (2). Accordingly, to design a lamp having a predetermined output power, e.g., $P_{out}$=5 W, the current $I_O$ flowing through the LED array 210 can be calculated according to equation (4). Thus, the number of LEDs required to generate output power of 5 W can be calculated if the current rating of an LED is known.

By way of example, to design an LED lamp with 5 Watts output power $P_{out}$ and having a power efficiency $\eta$ of 80%, assuming that the AC power source 202 generates a 60 Hz 110V AC voltage $V_{AC}$, and the peak voltage $V_P$ of the rectified AC voltage $V_{REC}$ is 155V, then the conduction angle $\theta$ is approximately 0.81 (46.43 degree) according to equation (5). According to equation (2), the forward voltage $V_O$ can be given by: 155*sin(0.81)≈112V. According to equation (4), the current $I_O$ is approximately 92 mA. Assuming that an LED has a forward voltage of 3.2V, the number of LEDs in each LED string of the LED array 210 can be given by: 112V/3.2V=35. If an LED has a rated current of 20 mA, then the LED array 210 can include 5 LED strings and each LED string includes 35 LEDs. The power dissipation $P_{loss}$, e.g., on the power switch Q1 and the sensing resistor $R_{SET}$ is: $P_{loss}=P_{in}-P_{out}=[(1/\eta)-1]P_{out}≈1.25$ W.

Furthermore, the power factor PF of the system can be calculated by:

$$PF = \frac{P_{in}}{V_{rms} \times I_{rms}}, \quad (7)$$

where $P_{in}$ represents the average input power which can be obtained according to equation (3), $V_{rms}$ represents the root-mean-square of the input voltage $V_{REC}$ and $I_{rms}$ represents the root-mean-square of the input current to the LED array 210. $V_{rms}$ and $I_{rms}$ can be given by:

$$V_{rms} = \frac{V_P}{\sqrt{2}}; \quad (8)$$

$$I_{rms} = I_0 \times \sqrt{1 - \frac{2 \times \theta}{\pi}}. \quad (9)$$

Therefore, the power factor PF can be obtained by:

$$PF = \frac{2 \times \sqrt{2}}{\pi} \times \frac{\cos\theta}{\sqrt{1 - \frac{2 \times \theta}{\pi}}}. \quad (10)$$

Figure 5:
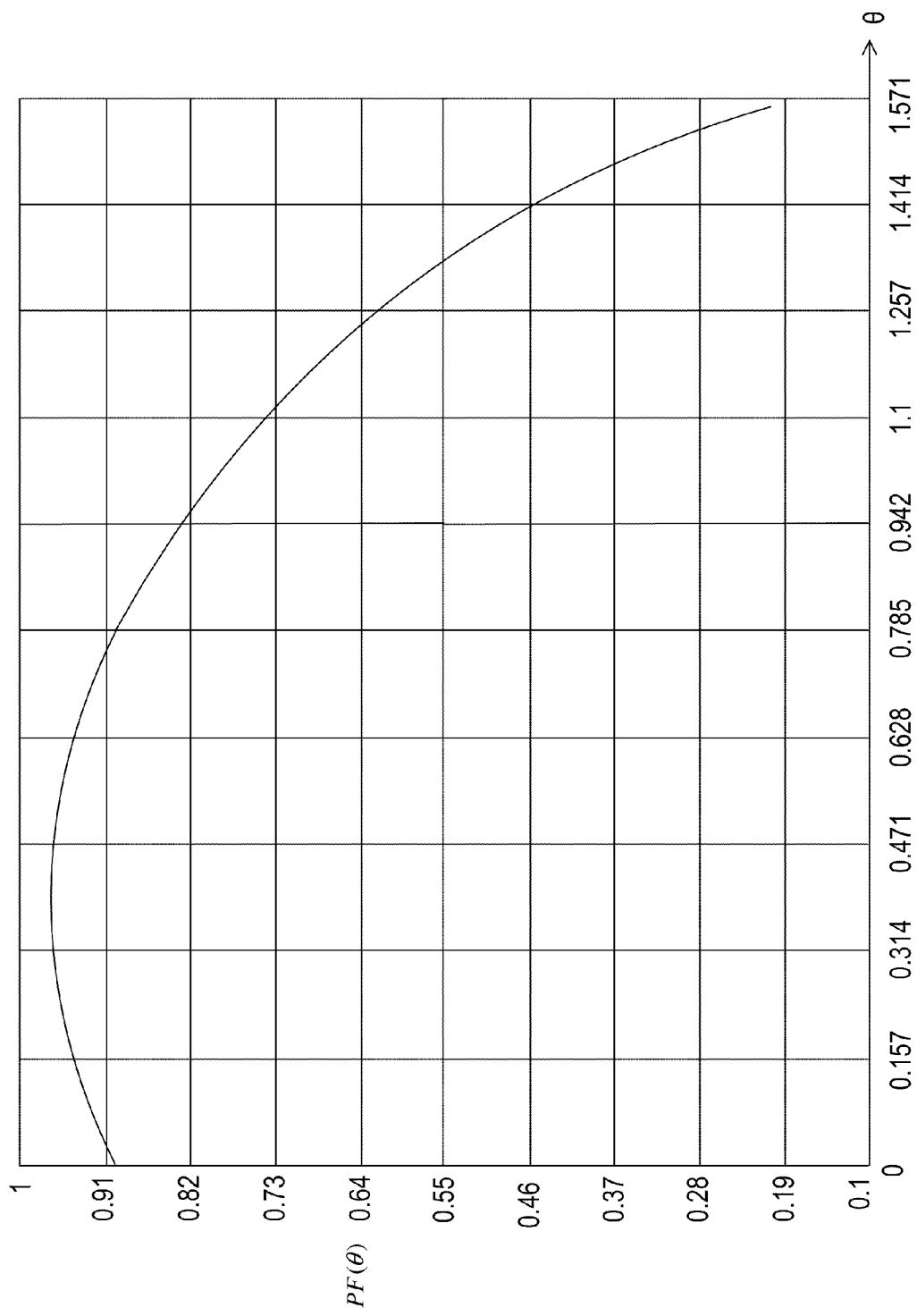
FIG. 5 shows the relationship between a system power factor and a conduction angle, in accordance with one embodiment of the present invention.

FIG. 5 shows the relationship between the power factor PF and the conduction angle $\theta$, in accordance with one embodiment of the present invention. Advantageously, as shown in FIG. 4 and FIG. 5, the driving circuit can achieve relatively high power efficiency $\eta$ and also relatively high power factor PF by selecting a proper conduction angle $\theta$. For example, if the conduction angle $\theta$ is 0.81, the power efficiency $\eta$ is approximately 80% and the power factor PF is approximately 0.89. Moreover, the driving circuit can achieve relatively high power factor without additional power factor correction circuit which may include inductors, power switches and control circuitry.

In one embodiment, the switch Q1 and the operational amplifier 206 constitute a controller and can be integrated in an integrated circuit 230. Moreover, the bridge rectifier 204, the integrated circuit 230, and the sensing resistor $R_{SET}$ can be mounted on a printed circuit board (PCB). The light source such as the LED array 210 shown in FIG. 2 can be mounted on a separate PCB, in one embodiment. In another embodiment, the bridge rectifier 204, the integrated circuit 230, the sensing resistor $R_{SET}$ and the light source such as the LED array 210 can be mounted on a single PCB.

Figure 6:
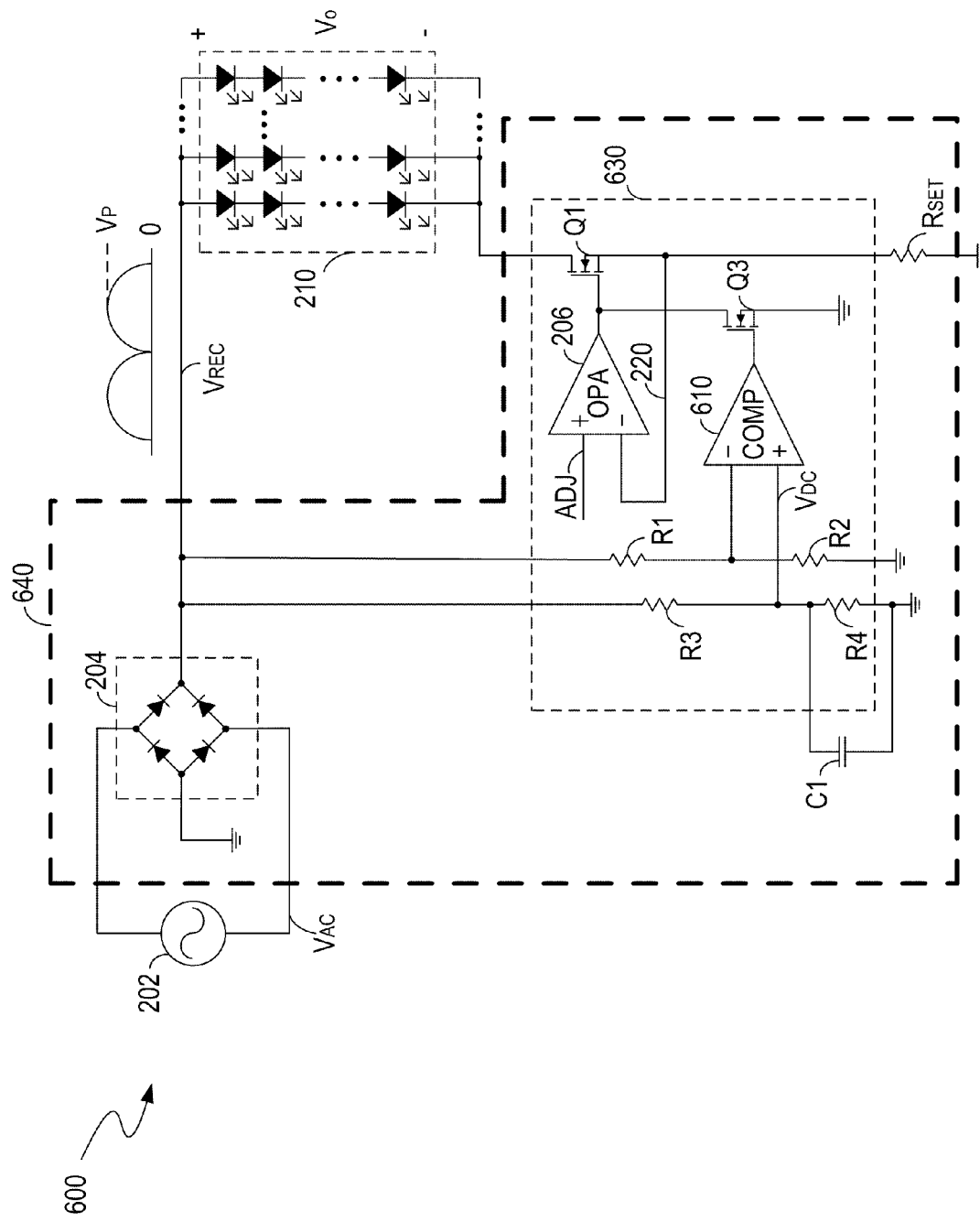
FIG. 6 shows a driving circuit, in accordance with another embodiment of the present invention.

FIG. 6 shows a driving circuit 600, in accordance with another embodiment of the present invention. Elements labeled the same as in FIG. 2 have similar functions. The driving circuit 600 includes an AC/DC linear converter 640 which further includes the control circuitry to control the switch Q1. In one embodiment, the LED light source 210 is powered on and regulated when a signal indicative of the rectified AC voltage $V_{REC}$ is greater than a DC voltage, and the LED light source 210 is powered off when the signal indicative of the rectified AC voltage $V_{REC}$ is less than the DC voltage.

More specifically, the output of the operational amplifier 206 controls the switch Q1 linearly when a signal $V_1$ indicative of the rectified AC voltage $V_{REC}$ is greater than a DC voltage $V_{DC}$. The output operational amplifier 206 is held to a low voltage, thereby turning off the switch Q1 when the signal $V_1$ indicative of the rectified AC voltage $V_{REC}$ is less than the DC voltage $V_{DC}$, in one embodiment. In the example of FIG. 6, the AC/DC linear converter 640 further includes a comparator 610 for comparing the signal $V_1$ to the DC voltage $V_{DC}$ to control a switch Q3 coupled to the operational amplifier 206. The signal $V_1$ is proportional to the rectified AC voltage $V_{REC}$. For example, the driving circuit 600 includes a voltage divider including resistors R1 and R2 for receiving the rectified AC voltage $V_{REC}$ and providing the signal $V_1$. In one embodiment, the DC voltage $V_{DC}$ is proportional to an average level of the rectified AC voltage $V_{REC}$. For example, the driving circuit 600 includes a voltage divider including resistors R3 and R4. An average filtering capacitor C1 is coupled to the resistor R4 in parallel. Thus, the DC voltage $V_{DC}$ is proportional to an average level of the rectified AC voltage $V_{REC}$, in one embodiment. In the embodiment, when the voltage $V_1$ is greater than the DC voltage $V_{DC}$, the comparator 610 turns off the switch Q3 such that the output of the operational amplifier 206 controls the switch Q1 linearly. When the voltage $V_1$ is less than the DC voltage $V_{DC}$, the comparator 610 turns on the switch Q3 such that the output of the operational amplifier 206 is grounded and thus the switch Q1 is turned off. Advantageously, the driving circuit 600 is capable of controlling the LED array 210 to generate substantially constant brightness even if the input AC voltage $V_{AC}$ fluctuates.

Figure 7:
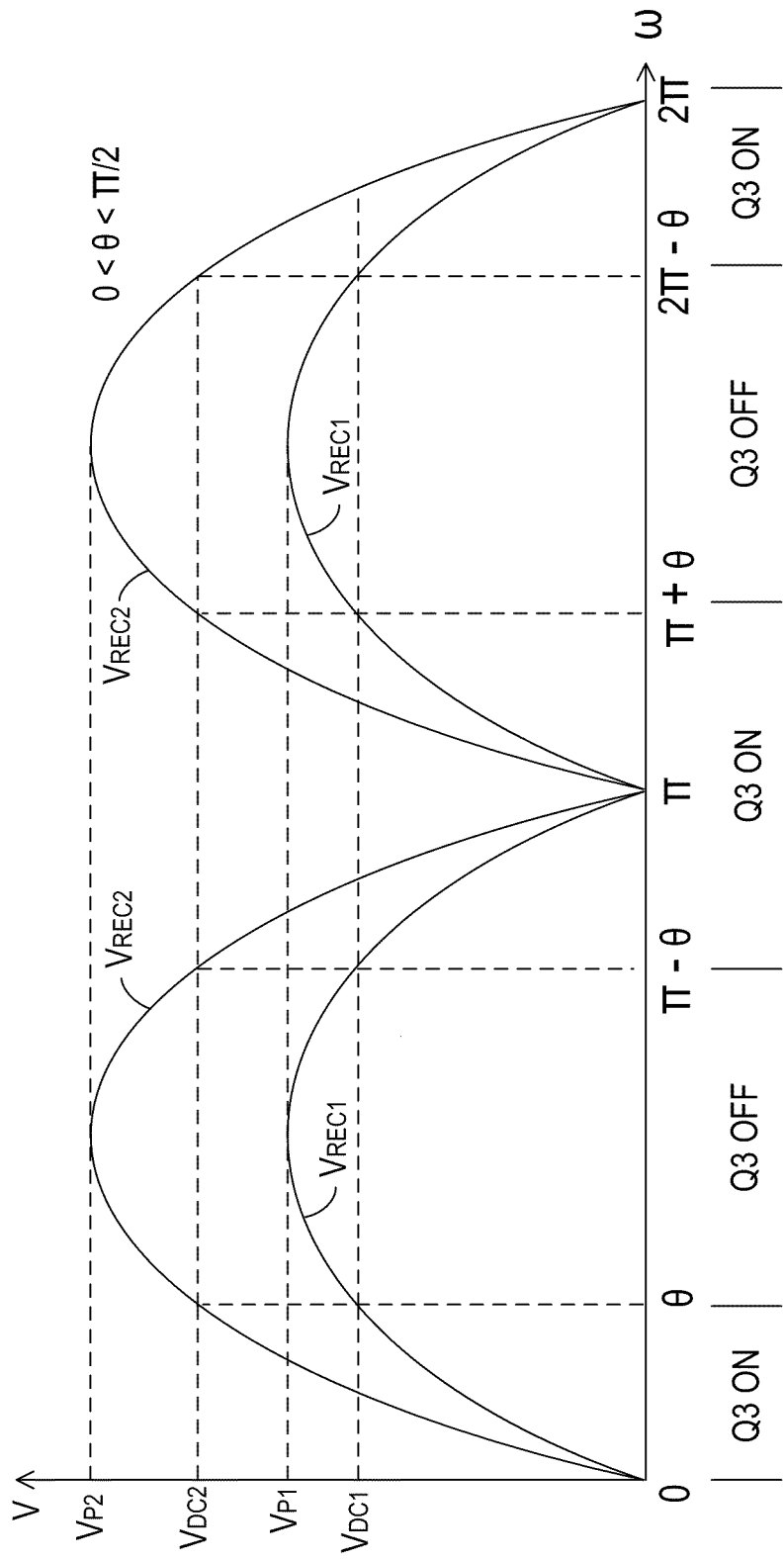
FIG. 7 shows an example of a rectified AC voltage $V_{REC1}$ and a rectified AC voltage $V_{REC2}$, in accordance with another embodiment of the present invention.

FIG. 7 shows an example of a rectified AC voltage $V_{REC1}$ and a rectified AC voltage $V_{REC2}$ during the period 0 to $2\pi$, and is described in combination with FIG. 6. In one embodiment, the rectified AC voltage $V_{REC1}$ and $V_{REC2}$ are periodic voltage signals, e.g., half-wave sinusoidal voltage signals. By way of example, if the input AC voltage $V_{AC}$ fluctuates from $V_{AC1}$ to $V_{AC2}$, the rectified AC voltage varies from $V_{REC1}$ to $V_{REC2}$ accordingly. The rectified AC voltage $V_{REC1}$ has a peak value $V_{P1}$ and the rectified AC voltage $V_{REC2}$ has a peak value $V_{P2}$. Since the DC voltage $V_{DC}$ is proportional to an average level of the rectified AC voltage $V_{REC}$, the DC voltage also varies from $V_{DC1}$ to $V_{DC2}$ accordingly. Advantageously, as shown in the example of FIG. 7, the switch Q3 is turned on during 0~θ, (π−θ)~(π+θ), and (2π−θ)~2π, and the switch Q3 is turned off during θ~(π−θ) and (π+θ)~(2π−θ) regardless of whether the rectified AC voltage is $V_{REC1}$ or $V_{REC2}$. In one embodiment, when the switch Q3 is on, the switch Q1 is off, and when the switch Q3 is off, the switch Q1 is controlled linearly to regulate the current through the LED array 210 by comparing the reference signal ADJ to the sensing signal 220. In other words, even if the rectified AC voltage $V_{REC}$ varies which is caused by the fluctuation of the input AC voltage $V_{AC}$, the switch Q1 is still conducted at the same conduction angle such that the LED array 210 has substantially constant brightness.

In the example of FIG. 6, the DC voltage $V_{DC}$ can be given by:

$$V_{DC} = \frac{2}{\pi} V_p \times \frac{R4}{R3 + R4}, \quad (11)$$

where R3 represents the resistance of the resistor R3, and R4 represents the resistance of the resistor R4. By way of example, the voltage divider R3 and R4 is chosen in a way to suit integrated circuit design such as 2.0V DC voltage at the non-inverting input of the comparator 610, e.g., $V_{DC}$=2.0V. Assuming that the peak voltage $V_P$ of the rectified AC voltage $V_{REC}$ is 155V, the proportional R3 and R4 divider can be obtained by the following:

$$2 = \frac{2}{\pi} \times 155 \times \frac{R4}{R3+R4} \Rightarrow \frac{R4}{R3+R4} = \frac{\pi}{155} \approx 0.02. \quad (12)$$

Knowing that switch Q1 is on when the rectified AC voltage $V_{REC}$ is greater than the forward voltage $V_O$ of the LED array 210, the voltage $V_1$ at the inverting input of comparator 610 is a fraction of $V_{REC}$ by properly choosing the resistor divider including the resistors R1 and R2. Assuming that the forward voltage $V_O$ of the LED array 210 is 112V and the peak voltage $V_P$ of the rectified AC voltage $V_{REC}$ is 155V, the proportional R1 and R2 divider can be obtained by the following:

$$\frac{R2}{R1+R2} = \frac{2.0}{112} \approx 0.0178. \quad (13)$$

Assuming that due to the variation of the AC voltage $V_{AC}$, the peak voltage $V_P$ of the rectified AC voltage $V_{REC}$ is changed from 155V to 180V. According to equation (11), the DC voltage $V_{DC}$ is changed to:

$$V_{DC} = \frac{2}{\pi} \times \frac{R4}{R3+R4} \times 180 \approx 2.322\ V. \quad (14)$$

According to equation (2), $$\sin\theta = \frac{V_{DC}}{V_P} \times \frac{R1+R2}{R2}.$$

Thus, θ≈0.81 (46.43 degree), which is the same as the conduction angle when the peak voltage $V_P$ of the rectified AC voltage $V_{REC}$ is equal to 155V. By switching on the switch Q1 at the same conduction angle ↓ even when the rectified AC voltage $V_{REC}$ varies, the brightness of the LED array 210 is therefore maintained substantially constant.

Referring to FIG. 2, if the peak voltage $V_P$ of the rectified AC voltage $V_{REC}$ is changed from 155V to 180V due to the variation of the AC voltage $V_{AC}$, then the conduction angle θ is approximately 0.67 (38.48 degree) according to the following:

$$V_0 = V_P \times \sin\theta \Rightarrow 112V = 180V \times \sin\theta \Rightarrow \theta \approx 0.67. \quad (15)$$

Thus, if the driving circuit 200 in FIG. 2 is employed, the output power $P_{out}$ can be given by:

$$P_{out} = I_0 \times V_0 \times \left(1 - \frac{2\times\theta}{\pi}\right) \quad (16)$$

$$= I_0 \times 112 \times \left(1 - \frac{2\times 0.67}{\pi}\right)$$

$$\approx 5.91\ \text{Watts},$$

which indicates that the brightness varies if the peak voltage $V_P$ of the rectified AC voltage $V_{REC}$ is changed from 155V to 180V due to the variation of the AC voltage $V_{AC}$. Moreover, the power dissipation can be obtained by:

$$P_{loss} = P_{in} - P_{out} = [(1/\eta)-1]P_{out} \approx 2.41\ \text{Watts}. \quad (17)$$

By employing the driving circuit 600 in FIG. 6, the power efficiency is further enhanced. For example, by employing the driving circuit in FIG. 6, the power loss when the rectified voltage is $V_{REC2}$ having a peak voltage of 180V is:

$$P_{loss} = P_{in} - P_{out} \quad (18)$$

$$= \frac{1}{\pi} \times I_0 \times V_p \times 2 \times \cos\theta - 5\ \text{Watts}$$

$$= \frac{1}{\pi} \times I_0 \times 180 \times 2 \times \cos(0.81) - 5\ \text{Watts}$$

$$\approx 2.27\ \text{Watts}.$$

In one embodiment, the switches Q1 and Q3, the operational amplifier 206, the comparator 610 and the resistors R1, R2, R3 and R4 constitute a controller and can be integrated in an integrated circuit 630. In another embodiment, resistors R1 and/or R3 can be outside the integrated circuit for design flexibility. Moreover, the bridge rectifier 204, the filtering capacitor C1, the sensing resistor $R_{SET}$, and the integrated circuit 630 can be mounted on a printed circuit board (PCB). The light source such as the LED array 210 shown in FIG. 6 can be mounted on a separate PCB, in one embodiment. In another embodiment, the bridge rectifier 204, the filtering capacitor C1, the integrated circuit 630, the sensing resistor $R_{SET}$ and the light source such as the LED array 210 can be mounted on a single PCB.

Figure 8:
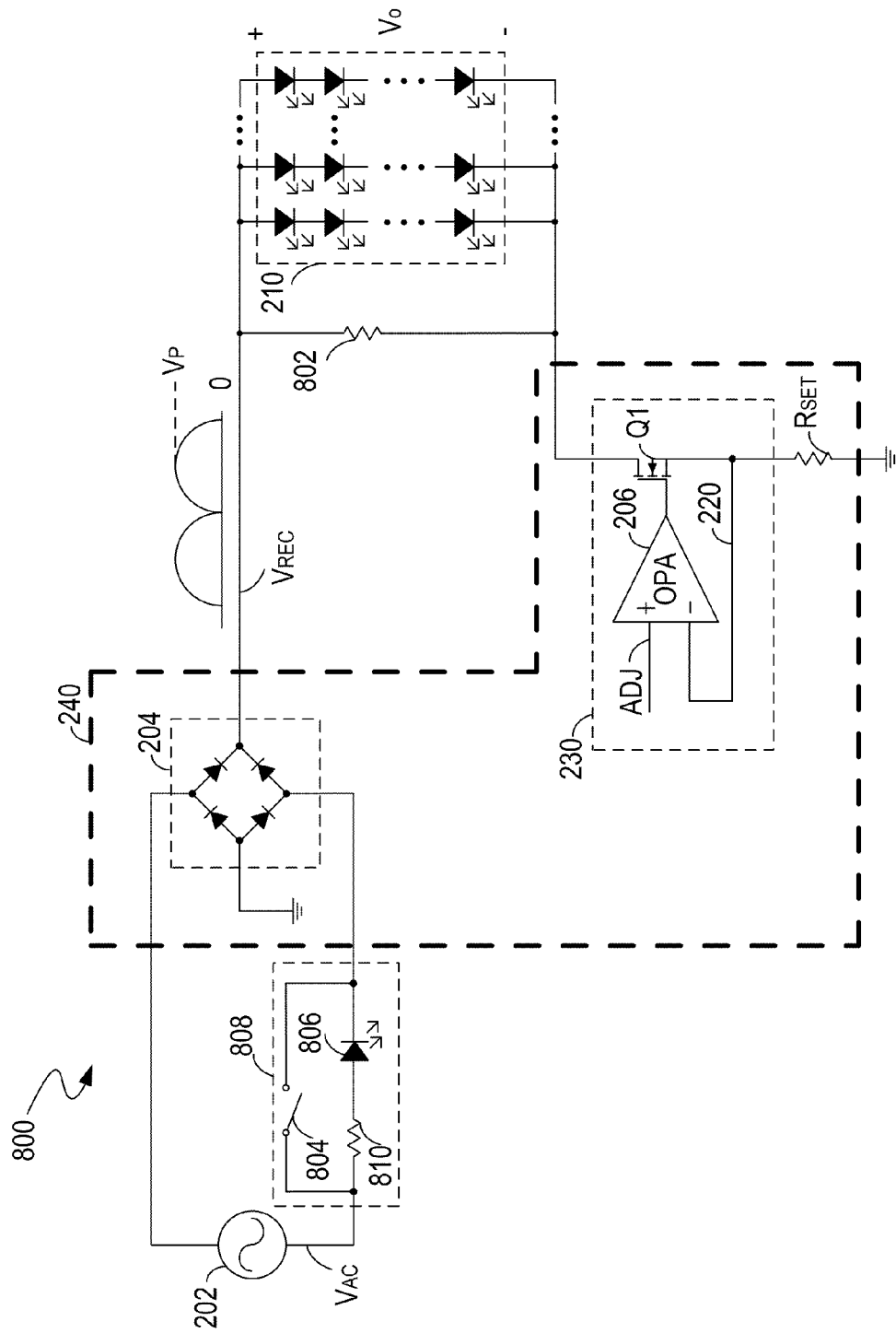
FIG. 8 shows a driving circuit coupled to an illuminated switch, in accordance with one embodiment of the present invention.

FIG. 8 shows a driving circuit 800 coupled to an illuminated switch 808, in accordance with one embodiment of the present invention. The driving circuit 800 is similar to the driving circuit 200 in FIG. 2, and further includes a current path coupled in parallel with the LED array 210. The current path includes a resistor 802, in one embodiment. The illuminated switch 808 includes an illuminating indicator, e.g., an LED 806 as shown in FIG. 8 or other type of light sources such as a neon lamp. The LED 806 is coupled to a resistor 810 in series. The illuminated switch 808 further includes a switch 804 coupled between the AC power source 202 and the bridge rectifier 204. The switch 804 is also coupled in parallel with the LED 806 and the resistor 810.

In operation, if the switch 804 is turned on, the LED array 210 is powered on to its rating and is regulated when the rectified AC voltage $V_{REC}$ is greater than the forward voltage $V_O$ of the LED array 210. If the switch 804 is turned off, a current flows from the AC power source 202 through the resistor 810, the LED 806, the bridge rectifier 204, the current path including the resistor 802 to ground. Accordingly, the LED 806 is turned on, which allows the user to locate the switch in the dark. The resistance of the resistor 802 is selected in a way that the voltage across the LED array 210 is less than the forward voltage $V_O$ of the LED array 210 when the rectified AC voltage $V_{REC}$ reaches its peak voltage $V_P$ when the switch 804 is turned off. Therefore, the LED array 210 remains off if the switch 804 is turned off.

Figure 9:
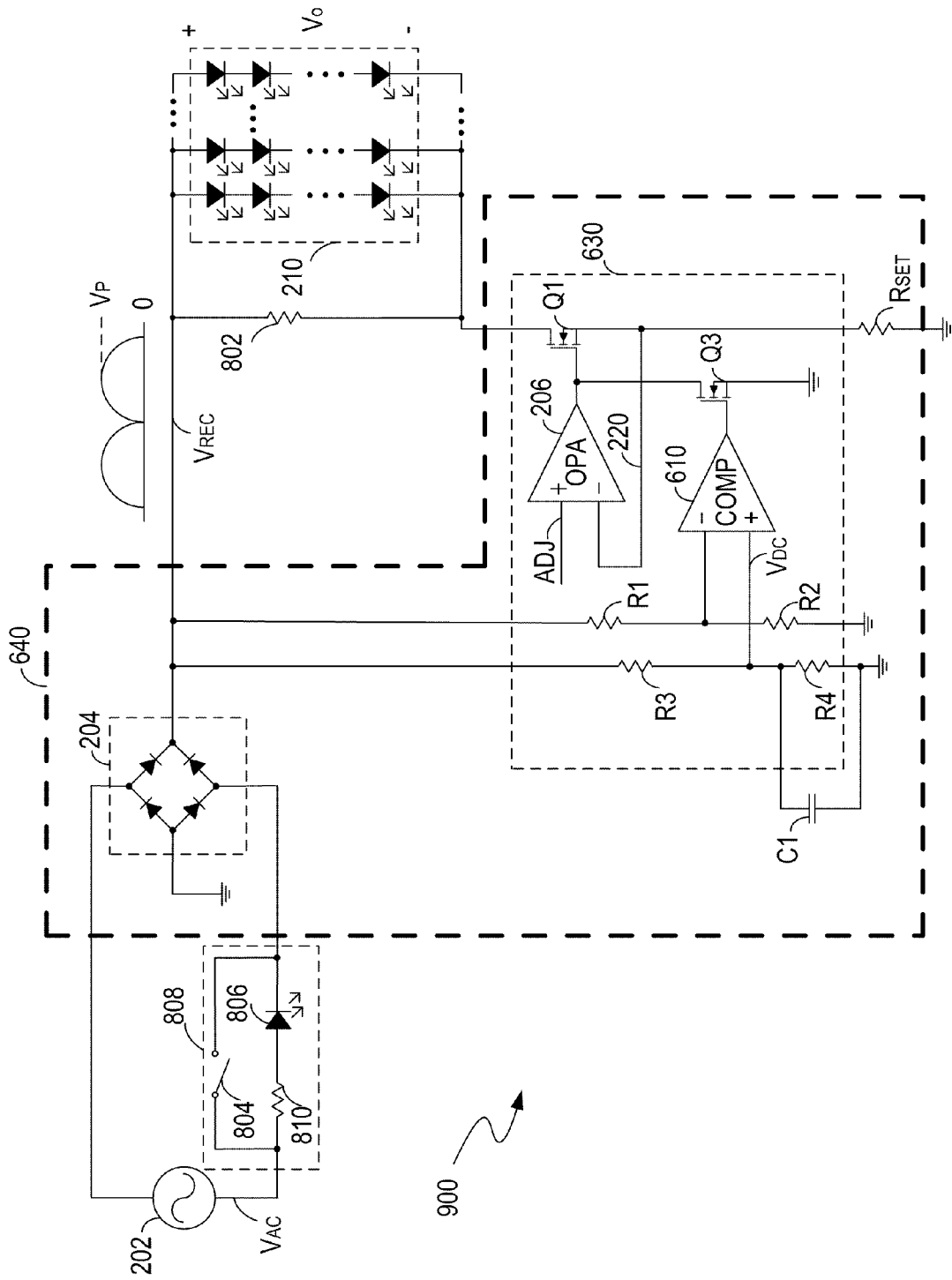
FIG. 9 shows a driving circuit coupled to an illuminated switch, in accordance with another embodiment of the present invention.

FIG. 9 shows a driving circuit 900 coupled to an illuminated switch 808, in accordance with another embodiment of the present invention. The driving circuit 900 is similar to the driving circuit 600 in FIG. 6, and further includes a current path coupled in parallel with the LED array 210. The current path includes a resistor 802, in one embodiment. Similarly, having the current path coupled between the bridge rectifier 204 and the switch Q1, the driving circuit 900 can work with the illuminated switch 808.

Figure 10:
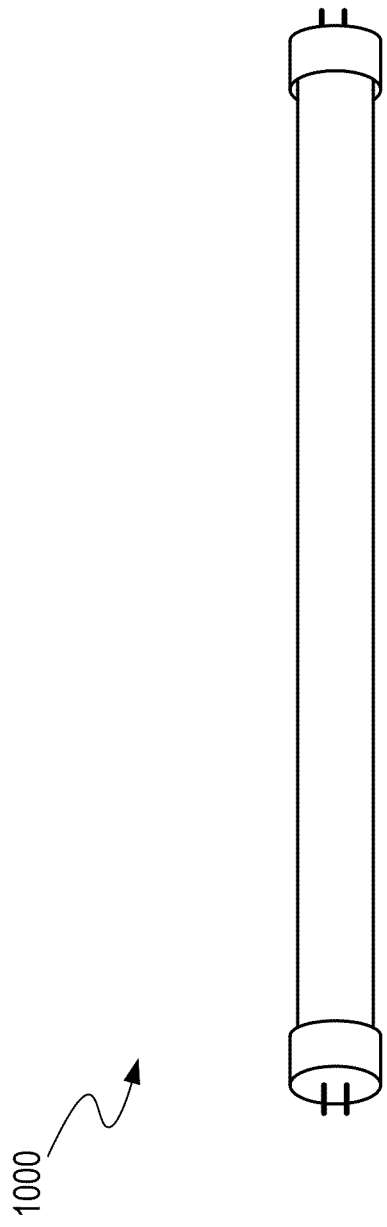
FIG. 10 shows a light tube, in accordance with one embodiment of the present invention.
Figure 11:
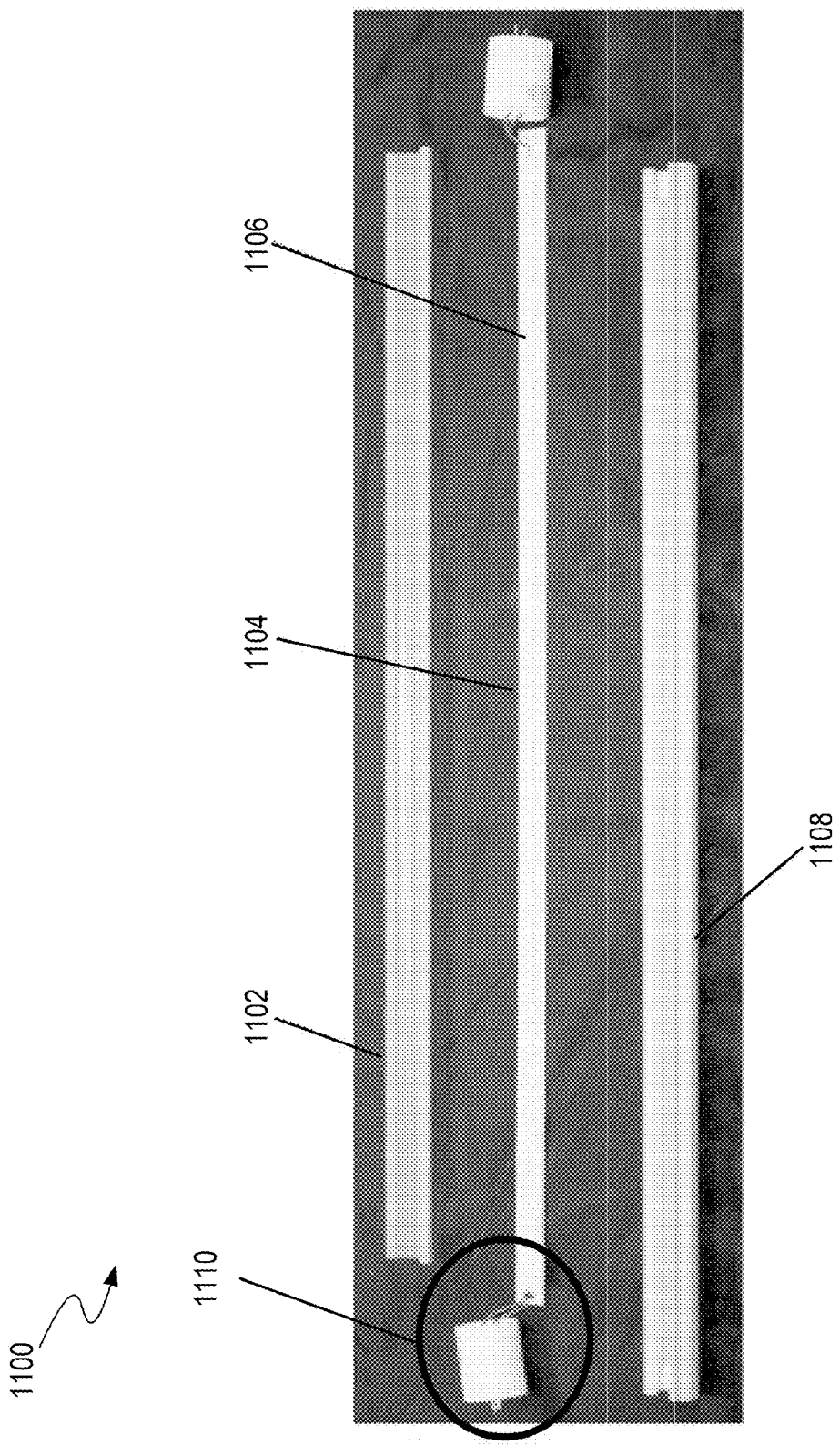
FIG. 11 shows a breakdown view of a light tube, in accordance with one embodiment of the present invention.

FIG. 10 shows a light tube 1000, in accordance with one embodiment of the present invention. FIG. 11 shows a breakdown view of the light tube 1000 in FIG. 10. The light tube 1000 includes an electrical portion 1110 for receiving AC power, a PCB 1104, an LED string 1106, a plastic cover 1102 and a metallic portion 1108 for housing the PCB 1104 and the LED string 1106. Advantageously, the AC/DC linear converter 240 or 640 is mounted on the PCB 1104 with the LED string 1106.

Accordingly, embodiments in accordance with the present invention provide circuits and methods for driving one or more light sources such as a light-emitting diode (LED) light source. Advantageously, the driving circuits employ an AC/DC linear converter, which achieves relatively high power efficiency and power factor, and also relatively small size and low cost unlike the conventional light source driving circuits which may require switching-mode DC/DC converters including bulky inductors, capacitors and switching devices. Moreover, the AC/DC linear converter in accordance with embodiments of the present invention does not generate electromagnetic interference (EMI) noise, and thus does not require EMI filters. Due to the relatively small size, the driving circuits in accordance with embodiments of the present invention can be used in lighting fixtures including, but are not limited to E12, E14, E17 light bulbs or T-5 and T-8 tubes. Moreover, circuits and methods disclosed in present invention can work with an illuminated switch, thereby providing convenience to users.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A printed circuit board (PCB) comprising:
a bridge rectifier operable for rectifying an AC voltage to a rectified AC voltage;
a light-emitting diode (LED) light source, wherein a terminal of said LED light source receives said rectified AC voltage; and
a first switch coupled to said LED light source in series and operable for controlling a current through said LED light source according to a predetermined current reference, wherein said first switch is controlled linearly,
wherein said LED light source is powered on and regulated when a signal indicative of said rectified AC voltage is greater than a DC voltage, and wherein said LED light source is powered off when said signal indicative of said rectified AC voltage is less than said DC voltage.

2. The PCB of claim 1, further comprising:
control circuitry coupled to said first switch and operable for controlling said first switch linearly by comparing a sensing signal indicative of said current through said LED light source to a reference signal indicative of said predetermined current reference.

3. The PCB of claim 2, further comprising:
a second switch coupled to said control circuitry; and
a comparator operable for comparing said signal indicative of said rectified AC voltage to said DC voltage and operable for generating a control signal to control said second switch.

4. The PCB of claim 2, further comprising:
a current sensor coupled to said LED light source in series and operable for providing said sensing signal.

5. The PCB of claim 2, wherein said control circuitry comprises an amplifier operable for comparing said sensing signal to said reference signal and operable for generating an error signal to control said first switch linearly.

6. The PCB of claim 1, wherein said DC voltage represents a forward voltage of said LED light source.

7. The PCB of claim 1, wherein said DC voltage is proportional to an average level of said rectified AC voltage.

8. The PCB of claim 1, wherein said rectified AC voltage comprises a periodic voltage signal.

9. The PCB of claim 1, wherein said rectified AC voltage comprises a half-wave sinusoidal voltage signal.

10. The PCB of claim 1, wherein said LED light source comprises a plurality of LEDs coupled in series.

11. The PCB of claim 1, further comprising:
a current path coupled in parallel with said LED light source.

12. The PCB of claim 1, wherein said current path comprises a resistor.

13. The PCB of claim 11, wherein a current flows from said bridge rectifier through said current path to ground if a third switch, which is coupled between an AC power source and said bridge rectifier, is turned off.

* * * * *